Sept. 3, 1929.　　　G. E. PRITCHARD　　　1,726,716
BEAN HARVESTER
Filed Dec. 23, 1926　　　2 Sheets-Sheet 1

George E. Pritchard
Inventor,
By C. A. Snow & Co.
Attorneys.

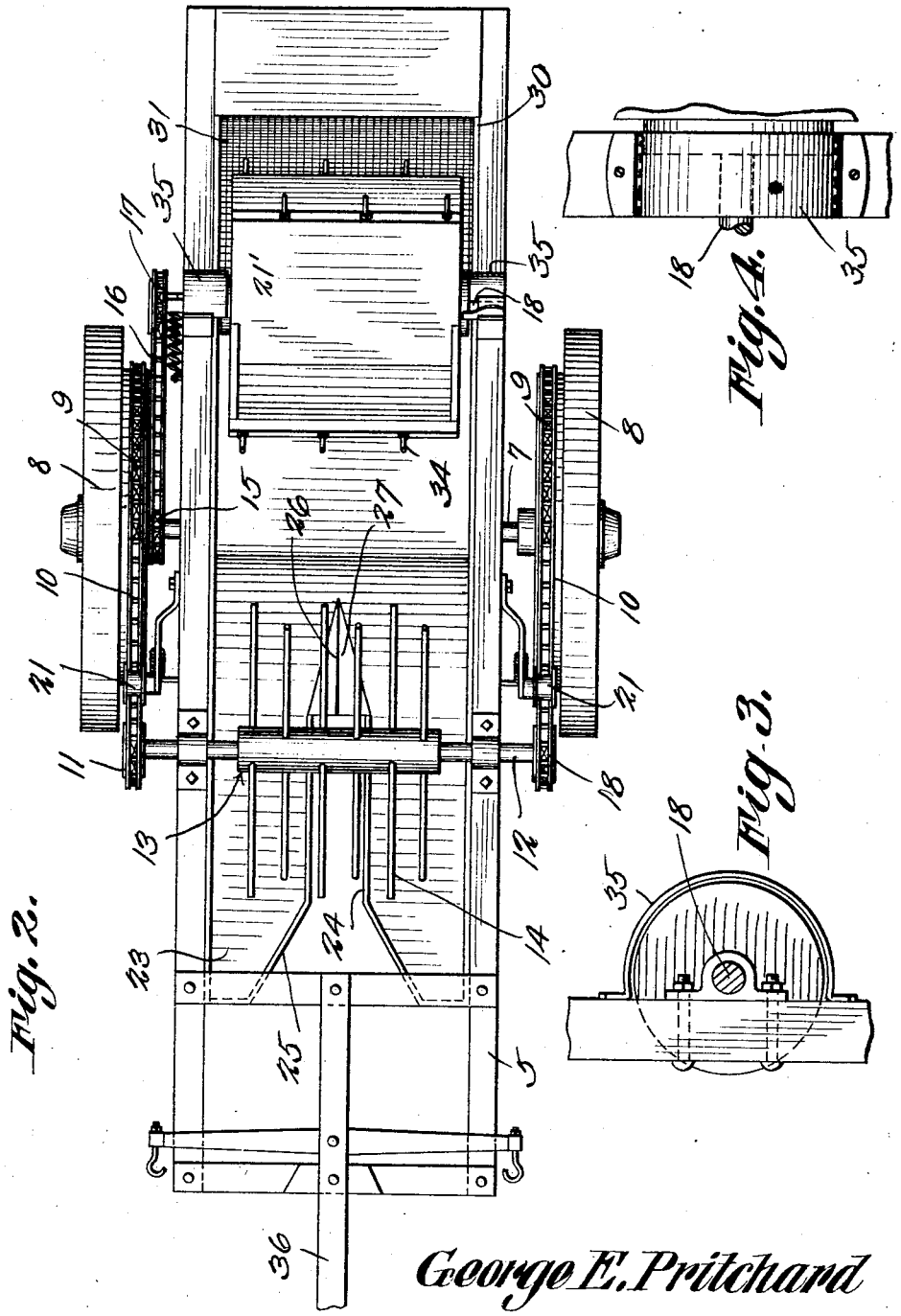

Patented Sept. 3, 1929.

1,726,716

UNITED STATES PATENT OFFICE.

GEORGE E. PRITCHARD, OF ELIZABETH CITY, NORTH CAROLINA.

BEAN HARVESTER.

Application filed December 23, 1926. Serial No. 156,661.

This invention relates to machines designed for harvesting and thrashing beans, peas or the like and separating them from the chaff.

An object of the invention is to provide means to prevent the vines and beans passing into the machine, from falling from the machine, while they are being picked up by the separating reel.

A further object of the invention is to construct a machine of this type, wherein the separating reel will operate in close proximity to the fingers of the gathering reel to remove the material therefrom and insure against the vines being carried around with the gathering reel.

A still further object of the invention is to provide teeth disposed adjacent to the separating reel to contact with the pea or bean pods to break the pods open so that the peas or beans may be separated therefrom.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 2 is a plan view of the machine.

Figure 3 is a detail view illustrating a guard for guarding the separating reel shaft.

Figure 4 is a detail front elevational view illustrating the shaft guard.

Figure 1:
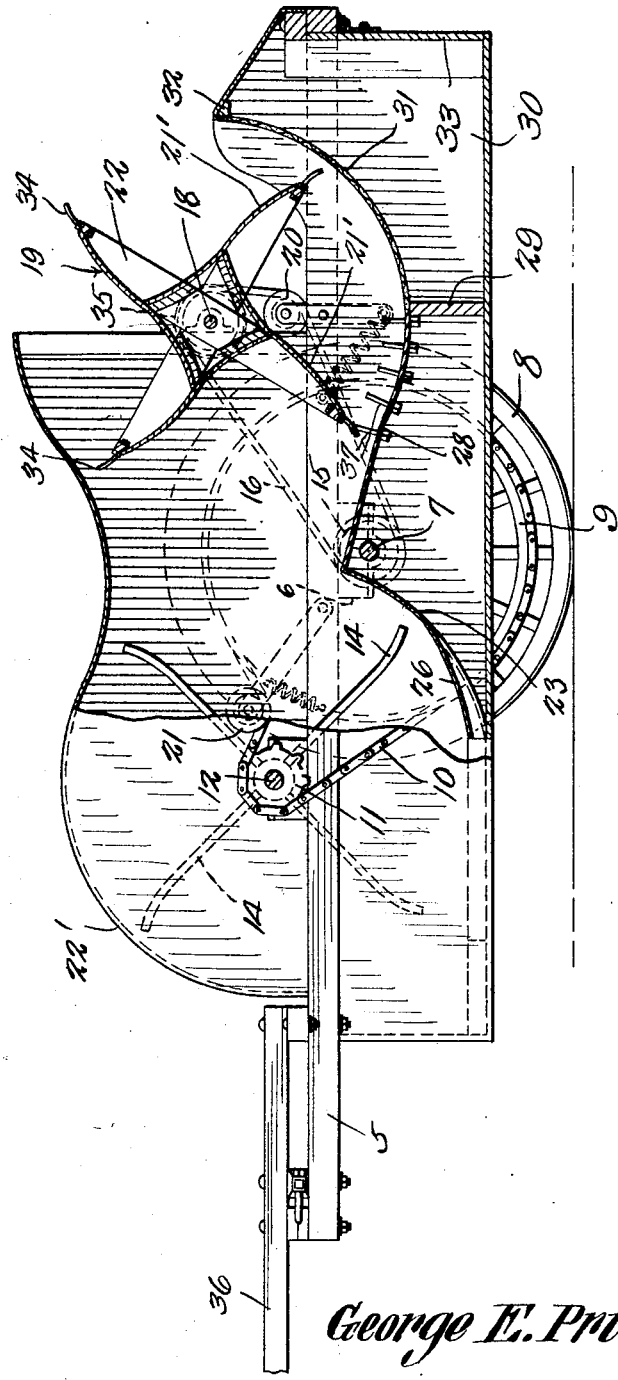
Figure 1 is an elevational view of a machine constructed in accordance with the invention, the same being partly shown in section.

Referring to the drawings in detail, the device includes a frame embodying side rails 5 to which the bearings 6 are secured, which bearings provide a support for the axle 7 on which the wheels 8 are mounted.

To each of these wheels is secured a sprocket 9 over which the chains 10 operate, which chains also operate over substantially small sprockets 11 mounted at the ends of the shaft 12 on which the gathering reel 13 is mounted, the gathering reel including a plurality of substantially long fingers 14 constructed of lengths of piping.

Secured to the axle 7 is a sprocket 15 over which the sprocket chain 16 operates, which chain also operates over the sprocket 17 mounted at one end of the shaft 18 and on which the separating reel 19 is secured. Idlers indicated at 20 and 21 respectively operate over the chains to hold the chains taut at all times.

The separating reel embodies a plurality of substantially wide plates curved as clearly shown by Figure 1. At the edges of the plates are flanges 22 that act to prevent material from passing out of the separating reel, to defeat the purpose of the invention.

The body portion or housing 22' completely houses the reels of the machine and includes a bottom 23 provided with a cut out portion 24, the walls thereof diverging as at 25 to feed the vines into the machine where they will be picked up by the gathering reel 13.

As clearly shown by Figure 1 of the drawings, the bottom 23 at a point adjacent to the center of the body is slightly bulged as at 26 defining inclined surfaces 27 to block the passages of vines which have been carried into the machine against reverse movement.

The housing is also provided with a discharge opening at the rear thereof, and as shown the separating reel is so located that the same is partially exposed, to the end that the vines which have been treated, may be carried to the rear of the machine and discharged through this opening.

The bottom 23 slopes upwardly to a point above the axle 7 where it slopes downwardly at 28, the end thereof being secured to the member 29 which forms one wall of the receiving chamber 30 into which the beans are deposited after they have been gathered and thrashed by the machine.

A curved screen 31 extends from the member 29 and is secured to the transversely disposed bar 32 so that the separating reel may carry the beans and vines over the screen 31 to cause the beans to be separated from the vines. The reference character 33 indicates a hinged closure for normally closing the chamber 30.

Fingers indicated at 34 form a part of the separating reel and are adapted to pick up the vines and carry them over the screen.

In order that the vines may not become wound around the shaft 18, a curved guard 35 is supported over the bearings in which the shaft 18 is supported. The machine may be moved over a field by hitching the power device to the tongue 36.

In order that the machine may operate on vines having exceptionally tough pods, fingers 37 are provided and arranged in rows transversely of the bottom at a point adjacent to the separating reel so that the pods will be moved over the fingers and torn open.

In the use of the machine, the machine is drawn through a field in such a way that the vines will pass into the cut out portion of the bottom, whereupon the gathering reel will pick up the vines and move them rearwardly where they will be picked up by the separating reel which carries them over the screen 31 where the beans fall from the vines and pass into the chamber 30.

I claim:

In a device of the class described, a housing having a bottom, sides, and an open end, a curved screening member forming a part of the bottom and disposed adjacent to the open end of the housing, a plurality of rows of fingers extending upwardly from the bottom, a thrashing reel including wide curved plates, said plates extending at right angles with respect to each other, the inner end of one curved plate resting against the adjacent curved plate at a point intermediate the ends thereof, elongated flange plates secured at the side edges of the curved plates of the reel and partially closing the ends of the reel, and spaced fingers extending from the free edges of the plates of the reel to cooperate with the first mentioned fingers to thrash grain passed through the machine.

In testimony that I claim the foregoing as my own, I have hereto affixed my signature.

GEORGE E. PRITCHARD.